United States Patent
Matsui et al.

(10) Patent No.: US 10,955,622 B2
(45) Date of Patent: Mar. 23, 2021

(54) CONNECTION DEVICE, OPTICAL CONNECTOR MANUFACTURING DEVICE, CONNECTION METHOD, AND METHOD FOR MANUFACTURING OPTICAL CONNECTOR

(71) Applicant: NIPPON TELEGRAPH AND TELEPHONE CORPORATION, Tokyo (JP)

(72) Inventors: Takashi Matsui, Tsukuba (JP); Kazuhide Nakajima, Tsukuba (JP); Masaki Wada, Tsukuba (JP); Yoko Yamashita, Tsukuba (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/770,531

(22) PCT Filed: Dec. 20, 2018

(86) PCT No.: PCT/JP2018/047009
§ 371 (c)(1),
(2) Date: Jun. 5, 2020

(87) PCT Pub. No.: WO2019/131441
PCT Pub. Date: Jul. 4, 2019

(65) Prior Publication Data
US 2020/0379187 A1    Dec. 3, 2020

(30) Foreign Application Priority Data
Dec. 27, 2017 (JP) .............................. JP2017-250511

(51) Int. Cl.
*G02B 6/38* (2006.01)

(52) U.S. Cl.
CPC .................................. *G02B 6/3801* (2013.01)

(58) Field of Classification Search
CPC ..................................................... G02B 6/3801
See application file for complete search history.

(56) References Cited

U.S. PATENT DOCUMENTS

| 9,034,222 B2 | 5/2015 | Koos et al. |
| 9,594,220 B1 | 3/2017 | Sutherland |

(Continued)

FOREIGN PATENT DOCUMENTS

| CN | 102819066 | 12/2012 |
| JP | 2005010373 | 1/2005 |

(Continued)

OTHER PUBLICATIONS

Amma et al., "Accuracy of core alignment with end-view function for multicore fiber", IEEE Summer topical meeting, pp. 170-171, Jul. 2014.

(Continued)

*Primary Examiner* — Sung H Pak
*Assistant Examiner* — Hoang Q Tran
(74) *Attorney, Agent, or Firm* — Ohlandt, Greeley, Ruggiero & Perle, L.L.P.

(57) ABSTRACT

According to the connection device, the connection method, the optical connector manufacturing device, and the method for manufacturing an optical connector, rotation alignment of an MCF becomes unnecessary because an image of an end surface of the MCF to be connected is captured, the position of the core is located, and an optical waveguide is formed on a substrate so as to match the position. Thus, it is possible to solve the problem of increasing loss or complex connection work caused by rotational misalignment in association with rotation alignment.

27 Claims, 12 Drawing Sheets

(56) References Cited

U.S. PATENT DOCUMENTS

| | | | |
|---|---|---|---|
| 10,649,155 B2 | 5/2020 | Konegawa et al. | |
| 2005/0254770 A1* | 11/2005 | Watanabe | G02B 6/3636 |
| | | | 385/137 |
| 2015/0301291 A1 | 10/2015 | Czosnowski et al. | |
| 2016/0223761 A1 | 8/2016 | Tetsuya et al. | |
| 2019/0113682 A1* | 4/2019 | Sakuma | G02B 6/02 |

FOREIGN PATENT DOCUMENTS

| | | |
|---|---|---|
| JP | 2014178628 | 9/2014 |
| JP | 2015064504 | 4/2015 |
| JP | 2015169873 | 9/2015 |
| JP | 2016504620 | 2/2016 |
| JP | 2017090838 | 5/2017 |
| JP | 2017191157 | 10/2017 |
| WO | 2017130627 | 8/2017 |

OTHER PUBLICATIONS

Tomson et al., "Ultrafast-laser inscription of a three dimensional fan-out device for multicore fiber coupling applications", Opt. Express, vol. 15, pp. 11691-11697, Sep. 2007.
Watanabe et al., "MPO Type 8-Multicore Fiber Connector With Physical Contact Connection", Journal of Lightwave Technology, vol. 34, No. 2, pp. 351-357, Jan. 15, 2016.
International Search Report dated Mar. 19, 2019 from corresponding International PCT Patent Application No. PCT/JP2018/047009, 2 pages.

* cited by examiner

CONNECTION DEVICE, OPTICAL CONNECTOR MANUFACTURING DEVICE, CONNECTION METHOD, AND METHOD FOR MANUFACTURING OPTICAL CONNECTOR

BACKGROUND

1. Field of the Disclosure

The present disclosure relates to a connection device and method for connecting a multi-core fiber, and a manufacturing device and method for manufacturing an optical connector for a multi-core fiber.

2. Discussion of the Background Art

A multi-core optical fiber (MCF) having a plurality of core regions has been studied actively for a dramatic increase in transmission capacity by using spatial multiplexing. Since such an MCF is high in space utilization efficiency and can achieve high-density optical wiring, attention has been given to applications to high-density optical wiring in data centers and the like.

Here, in order to lay and wire the MCF, it is essential to connect MCFs, but unlike a conventional single mode fiber (SMF), the MCF has a core placed outside the center, making it essential to make alignment including a rotation direction. Non Patent Literature 1 and Patent Literature 1 disclose a technique to make alignment including a core arrangement in the rotation direction through observation of a connection end surface and analysis of a side image (for example, in Non Patent Literature 3, it is required that a core rotation angle be within 1°) and fuse.

Further, when the MCF is connected to an existing single mode optical fiber (SMF) or an SMF device, the MCF is connected via an MCF fan-out device that converts the core arrangement of the MCF into an arrangement of a multi-fiber SMF array. Such an MCF fan-out device has an MCF fiber and a plurality of SMF fibers on input and output sides, and MCF fan-out devices of fiber bundle type, fusion-drawn type, stacked PLC type, and three-dimensional optical waveguide type have been proposed and used. In particular, the three-dimensional optical waveguide type disclosed in Non Patent Literature 2 allows any optical waveguide to be formed in three dimensions in glass or quartz using a short-pulse laser, so that a fan-out device can be manufactured for any MCF structure. Here, for a connection on the MCF side, the core arrangement in the rotation direction is aligned at a predetermined angle in the same manner as the above-described fusion connection, and then the connection is made by fusion or connector connection.

CITATION LIST

Patent Literature

Patent Literature 1: WO2017/130627 A

Non Patent Literature

Non Patent Literature 1: Y. Amma et al., "Accuracy of core alignment with end-view function for multicore fiber", IEEE Summer topical meeting, p. 170, July 2014.
Non Patent Literature 2: R. R. Tomson et al., "Ultrafast-laser inscription of a three dimensional fan-out device for multicore fiber coupling applications", Opt. Express, vol. 15, pp. 11691-11697, September 2007.
Non Patent Literature 3: Kengo Watanabe et al., "MPO Type 8-Multicore Fiber Connector With Physical Contact Connection", JOURNAL OF LIGHTWAVE TECHNOLOGY, VOL. 34, NO. 2, Jan. 15, 2016

However, according to a conventional MCF connection method, it is essential to make rotation alignment of the MCF, and there is a problem of increasing loss or complex connection work caused by rotational misalignment in association with rotation alignment.

SUMMARY

It is therefore an object of the present disclosure to provide a connection device, an optical connector manufacturing device, a connection method, and a method for manufacturing an optical connector, all of which make rotation alignment of an MCF unnecessary.

Solution to Problem

The connection device and the optical connector according to the present disclosure use an optical waveguide substrate in which an optical waveguide is three-dimensionally laser-inscribed on a glass or quartz substrate in accordance with a rotation angle of an MCF to be connected.

Specifically, the connection device according to the present disclosure is a connection device that connects an optical fiber serving as a connection destination and an optical fiber that is a multi-core fiber serving as a connection source using an optical waveguide substrate, the connection device including:

an end surface image acquisition part structured to acquire at least an image of a connection surface of a first fiber fixing part that is to be connected to a first end of the optical waveguide substrate and to which the optical fiber serving as a connection source is fixed;

a coordinate derivation part structured to acquire, from the image of the connection surface acquired by the end surface image acquisition part, coordinates of a center position of a core of the optical fiber exposed on the connection surface of the first fiber fixing part;

an optical waveguide formation part structured to inscribe, based on the coordinates acquired by the coordinate derivation part, an optical waveguide connecting the core of the optical fiber serving as a connection source to a core of the optical fiber serving as a connection destination on the optical waveguide substrate along a desired path extending from the first end to a second end of the optical waveguide substrate; and a connection part structured to connect the connection surface of the first fiber fixing part to the first end of the optical waveguide substrate and to connect a connection surface of a second fiber fixing part to which the optical fiber serving as a connection destination is fixed to the second end.

Further, a connection method according to the present disclosure is a connection method for connecting an optical fiber serving as a connection destination and an optical fiber that is a multi-core fiber serving as a connection source using an optical waveguide substrate, the connection method including:

an end surface image acquisition procedure of acquiring at least an image of a connection surface of a first fiber fixing part that is to be connected to a first end of the optical waveguide substrate and to which the optical fiber serving as a connection source is fixed;

a coordinate derivation procedure of acquiring, from the image of the connection surface acquired in the end surface image acquisition procedure, coordinates of a center position of a core of the optical fiber exposed on the connection surface of the first fiber fixing part;

an optical waveguide formation procedure of inscribing, based on the coordinates acquired in the coordinate derivation procedure, an optical waveguide connecting the core of the optical fiber serving as a connection source to a core of the optical fiber serving as a connection destination on the optical waveguide substrate along a desired path extending from the first end to a second end of the optical waveguide substrate; and a connection procedure of connecting the connection surface of the first fiber fixing part to the first end of the optical waveguide substrate having the optical waveguide inscribed in the optical waveguide formation procedure and connecting a connection surface of a second fiber fixing part to which the optical fiber serving as a connection destination is fixed to the second end.

Note that the connection method according to the present disclosure may be executed as follows:

An end surface image acquisition procedure of acquiring at least an image of a connection surface of a first fiber fixing part that is to be connected to a first end of the optical waveguide substrate and to which the optical fiber serving as a connection source is fixed;

a coordinate derivation procedure of acquiring, from the image of the connection surface acquired in the end surface image acquisition procedure, coordinates of a center position of a core of the optical fiber exposed on the connection surface of the first fiber fixing part;

a connection procedure of connecting the connection surface of the first fiber fixing part to the first end of the optical waveguide substrate; and an optical waveguide formation procedure of inscribing, based on the coordinates acquired in the coordinate derivation procedure, an optical waveguide connecting the core of the optical fiber serving as a connection source to a core of the optical fiber serving as a connection destination on the optical waveguide substrate along a desired path extending from the first end to a second end of the optical waveguide substrate.

Note that, in the connection procedure, the connection surface of the second fiber fixing part to which the optical fiber serving as a connection destination is fixed may be connected to the second end of the optical waveguide substrate, or after the optical waveguide formation procedure, the connection surface of the second fiber fixing part to which the optical fiber serving as a connection destination is fixed may be further connected to the second end of the optical waveguide substrate.

On the other hand, an optical connector manufacturing device according to the present disclosure is an optical connector manufacturing device that manufactures an optical connector structured to connect an optical fiber including a multi-core fiber to a different optical component, the optical connector manufacturing device including:

an end surface image acquisition part structured to acquire at least an image of a connection surface of a fiber fixing part that is to be connected to a first end of an optical waveguide substrate and to which the optical fiber is fixed;

a coordinate derivation part structured to acquire, from the image of the connection surface acquired by the end surface image acquisition part, coordinates of a center position of a core of the optical fiber exposed on the connection surface of the fiber fixing part;

an optical waveguide formation part structured to inscribe, based on the coordinates acquired by the coordinate derivation part, an optical waveguide connecting the core of the optical fiber to an optical port of the different optical component on the optical waveguide substrate along a desired path extending from the first end to a second end of the optical waveguide substrate;

a substrate preparation jig structured to prepare the optical waveguide substrate; and a substrate fixing jig structured to cause the optical waveguide substrate prepared by the substrate preparation jig to be inserted into and fixed to a multi-fiber connector ferrule.

Further, a method for manufacturing an optical connector according to the present disclosure is a method for manufacturing an optical connector structured to connect an optical fiber including a multi-core fiber to a different optical component, the method including:

an end surface image acquisition procedure of acquiring at least an image of a connection surface of a fiber fixing part that is to be connected to a first end of an optical waveguide substrate and to which the optical fiber is fixed;

a coordinate derivation procedure of acquiring, from the image of the connection surface acquired in the end surface image acquisition procedure, coordinates of a center position of a core of the optical fiber exposed on the connection surface of the fiber fixing part;

an optical waveguide formation procedure of inscribing, based on the coordinates acquired in the coordinate derivation procedure, an optical waveguide connecting the core of the optical fiber to an optical port of the different optical component on the optical waveguide substrate along a desired path extending from the first end to a second end of the optical waveguide substrate;

a substrate preparation process of preparing the optical waveguide substrate; and a substrate fixing process of causing the optical waveguide substrate prepared in the substrate preparation process to be inserted into and fixed to a multi-fiber connector ferrule.

According to the connection device, the connection method, the optical connector manufacturing device, and the method for manufacturing an optical connector of the present disclosure, rotation alignment of an MCF becomes unnecessary because an image of an end surface of the MCF to be connected is captured, the position of the core is located, and an optical waveguide is formed on a substrate so as to match the position. Thus, it is possible to solve the problem of increasing loss or complex connection work caused by rotational misalignment in association with rotation alignment. Therefore, according to the present disclosure, rotation alignment of an MCF can provide the connection device, the optical connector manufacturing device, the connection method, and the method for manufacturing an optical connector.

Further, in the connection device and the connection method according to the present disclosure, an image of the connection surface of the second fiber fixing part to which the optical fiber serving as a connection destination is fixed is further acquired, and coordinates of a center position of the core of the optical fiber exposed on the connection surface of the second fiber fixing part are further acquired. MCFs can be connected to each other without rotation alignment.

Further, in the optical connector manufacturing device and the method for manufacturing an optical connector according to the present disclosure, a space of the multi-fiber connector ferrule in which the optical waveguide substrate is held and the optical waveguide substrate form a rectangular shape on a plane orthogonal to a longitudinal direction of the optical fiber, and when the optical waveguide substrate is misaligned to a maximum degree in the space, a maximum distance between an apex of the space and an apex of the optical waveguide substrate on the orthogonal plane is equal to or less than d (μm) represented by an equation C1.

$$d=0.27(2w)-1.3 \qquad \text{(Equation C1)}$$

where 2w represents a mode field diameter (μm) of the optical fiber at a wavelength of 1550 nm.

It is essential for the connection between the MCF and the SMF to insert a fan-out device, and there is a problem of increasing loss or decreasing space utilization efficiency in association with device insertion. According to the optical connector manufacturing device and the method for manufacturing an optical connector according to the present disclosure, the optical connector can be reduced in size through three-dimensional formation of the optical waveguide in the substrate, and a degree of misalignment between the ferrule and the optical waveguide substrate that makes connection loss equal to or less than 1 dB is stipulated. For this reason, the use of this optical connector makes it possible to prevent a decrease in space utilization efficiency and to prevent an increase in insertion loss.

An optical waveguide substrate manufactured by the connection device and the connection method or by the optical connector manufacturing device and the method for manufacturing an optical connector includes:

a plurality of optical waveguides; and a connection surface to which multi-core fibers are connected, and an end of each of the optical waveguides to be connected to a corresponding one of cores of the multi-core fibers is exposed on the connection surface, and a rotation angle of a set of the ends for each of the multi-core fibers is larger than 1°.

The optical waveguide substrate according to the present disclosure eliminates the need for rotation alignment of the multi-core fibers to match the rotation angle as described in Non Patent Literature 3. In other words, according to the connection device and the connection method, or the optical connector manufacturing device and the method for manufacturing an optical connector of the present disclosure, the rotation angle of the multi-core fiber is larger than 1° on the connection surface of the fiber fixing part.

Advantageous Effects of Disclosure

According to the present disclosure, rotation alignment of an MCF can provide the connection device, the optical connector manufacturing device, the connection method, and the method for manufacturing an optical connector.

DETAILED DESCRIPTION OF THE PREFERRED EMBODIMENT

Figure 1:
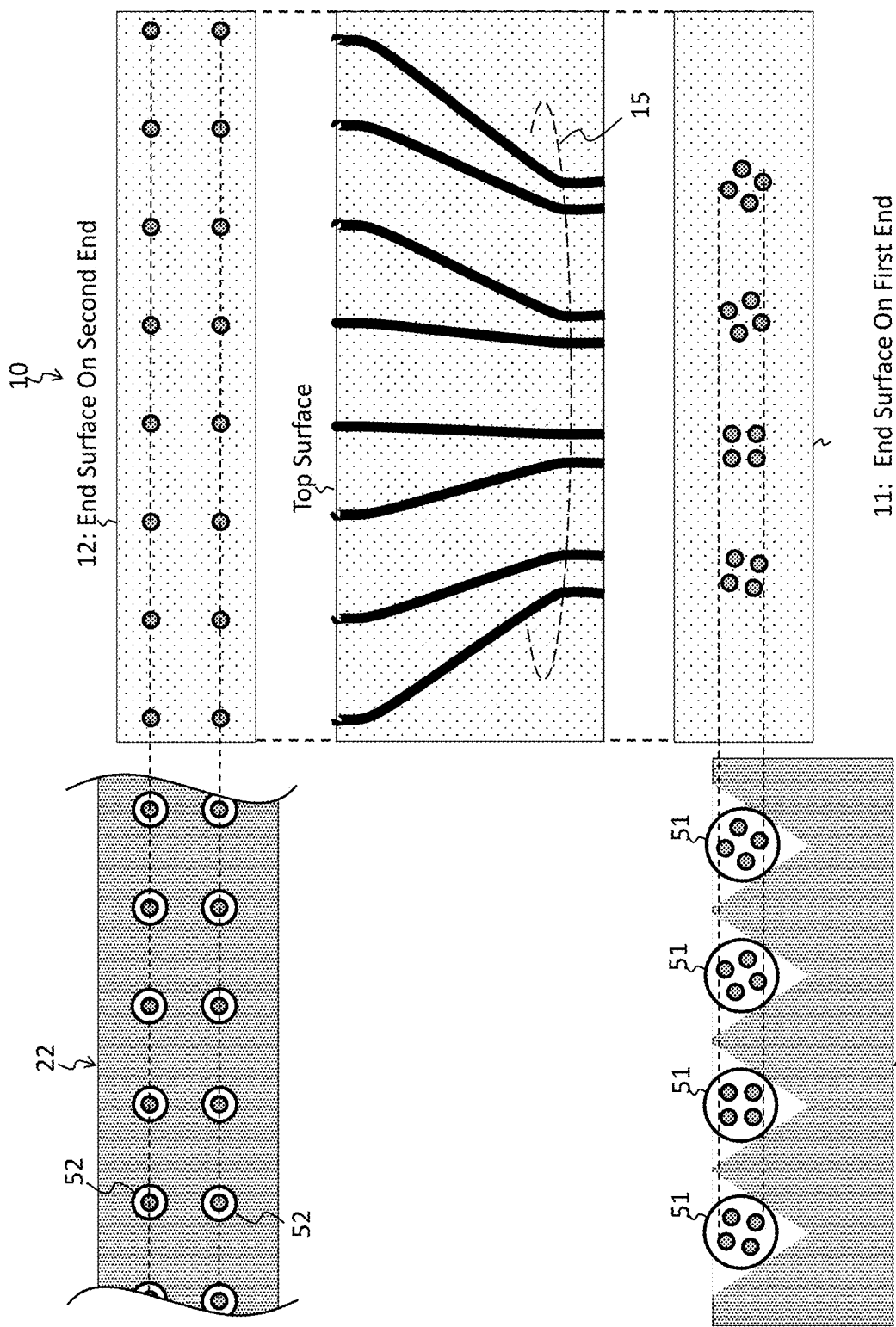
FIG. 1 is a diagram illustrating an optical fiber connection method according to the present disclosure.

Embodiments of the present disclosure will be described with reference to the accompanying drawings. The embodiments described below are examples of the present disclosure; therefore, the present disclosure is not limited to the following embodiments. Note that, in the following description and the drawings, components denoted by the same reference numerals are identical to each other.

First Embodiment

Figure 2:
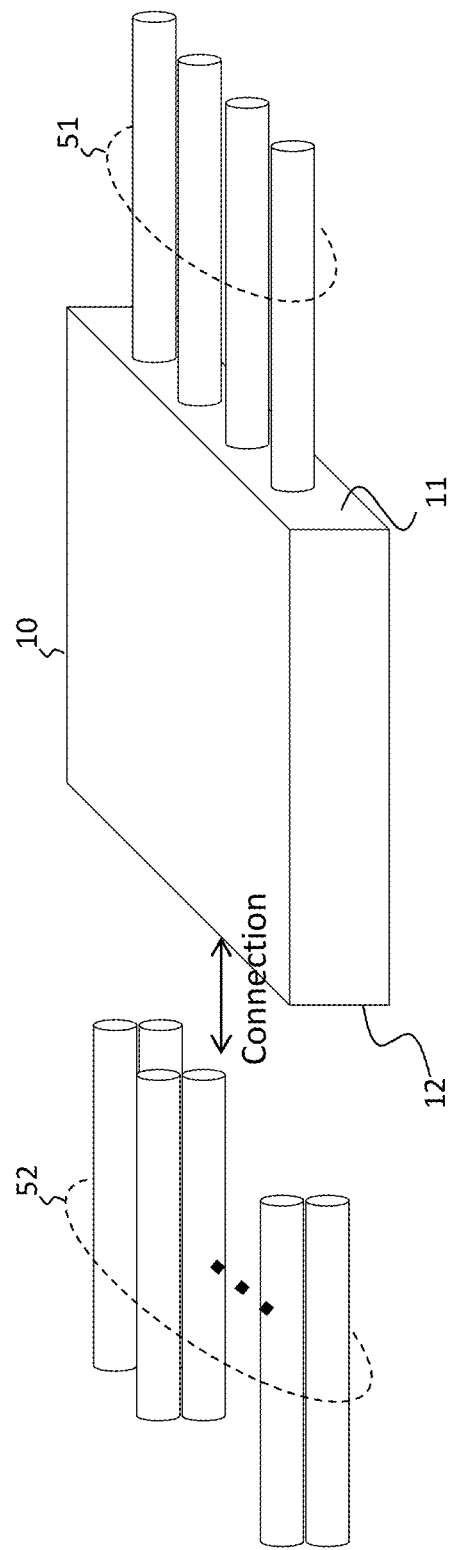
FIG. 2 is a diagram illustrating the optical fiber connection method according to the present disclosure.
Figure 3:
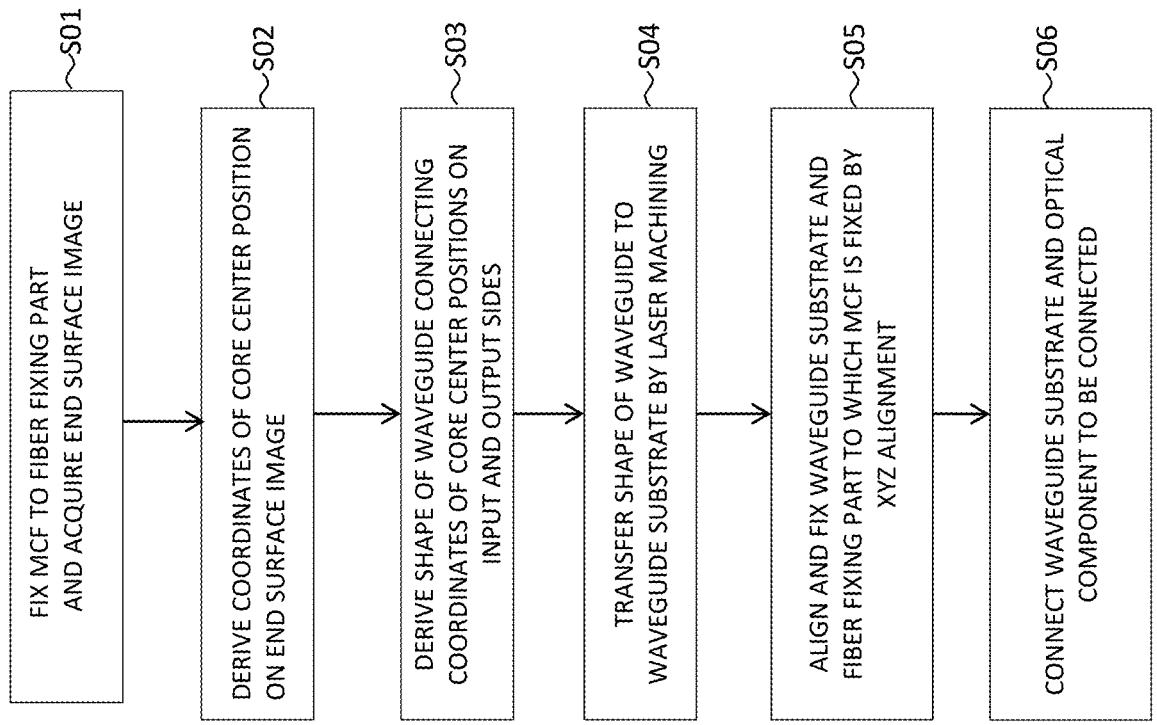
FIG. 3 is a flowchart illustrating the optical fiber connection method according to the present disclosure.

FIGS. 1 and 2 are diagrams illustrating an optical fiber connection method according to the present embodiment. Further, FIG. 3 is a flowchart illustrating the connection method according to the present embodiment. The optical fiber connection method for connecting an optical fiber 52 serving as a connection destination and an optical fiber 51 that is a multi-core fiber serving as a connection source using an optical waveguide substrate 10, the optical fiber connection method including:

an end surface image acquisition procedure S01 of acquiring at least an image of a connection surface of a first fiber fixing part 21 that is to be connected to a first end 11 of the optical waveguide substrate 10 and to which the optical fiber serving as a connection source is fixed;

a coordinate derivation procedure S02 of acquiring, from the image of the connection surface acquired in the end surface image acquisition procedure S01, coordinates of a center position of a core of the optical fiber exposed on the connection surface of the first fiber fixing part 21;

an optical waveguide formation procedure (S3 and S4) of inscribing, based on the coordinates acquired in the coordinate derivation procedure S02, an optical waveguide 15 connecting the core of the optical fiber serving as a connection source to a core of the optical fiber serving as a connection destination on the optical waveguide substrate 10 along a desired path extending from the first end 11 to a second end 12 of the optical waveguide substrate 10; and a connection procedure of connecting (step S05) the connection surface of the first fiber fixing part 21 to the first end 11 of the optical waveguide substrate 10 having the optical waveguide 15 inscribed in the optical waveguide formation procedure (S3 and S4) and connecting (step S06) a connection surface of a second fiber fixing part 22 to which the optical fiber serving as a connection destination is fixed to the second end 12.

According to the present embodiment, all of the optical fibers 51 that serve as connection sources and are fixed to the first fiber fixing part 21 are multi-core fibers, but at least one of the optical fibers 51 in the first fiber fixing part 21 may be a multi-core fiber, and the other optical fibers 51 may be single-core fibers. Further, according to the present embodiment, the optical fiber 52 that serves as a connection destination and is fixed to the second fiber fixing part 22 is a single-mode fiber. Hereinafter, each optical fiber 51 serving as a connection source may be referred to as "multi-core fiber 51" or "MCF 51".

The MCF 51 is fixed to a V-groove array or the like that holds fibers. At this time, the MCF 51 has not undergone any rotation control, a rotation angle of the MCF 51 changes each time as shown in a lower-left diagram of FIG. 1. As cross-sectional view of the MCF 51 is observed and analyzed with a microscope or the like (step S01), and coordinates of a core center position are obtained (step S02). With the coordinates of the core center position on an end surface of the optical waveguide substrate 10 (an end surface on the first end 11) thus obtained serving as a starting point, an endpoint is set at any coordinates (a position of a core of an optical fiber serving as a connection destination) on an end surface on an opposite side of the optical waveguide substrate 10 (an end surface on the second end 12), and a shape (path) of an optical waveguide connecting the two points is determined (step S03). Next, a substrate (e.g., a quartz glass block) is prepared, and causing a refractive index change to occur by multiphoton absorption using a short-pulse laser in the substrate forms the optical waveguide 15 to bring the optical waveguide substrate 10 to completion (step S04). Setting an appropriate origin position of the optical waveguide substrate 10 (an end of the substrate or a position of a marker) allows the optical waveguide 15 to be formed with high position accuracy.

Through steps S01 to S04, the end surface on the first end 11 of the optical waveguide substrate 10 has the same core arrangement as a core arrangement of an end surface of the MCF 51 that has not undergone rotation alignment. For this reason, aligning the end surface on the first end 11 of the optical waveguide substrate 10 with an end surface of the fiber fixing part 21 in horizontal and vertical directions allows each core of the MCF 51 to be connected to the optical waveguide 15 in the optical waveguide substrate 10 (step S05). The MCF 51 and the optical waveguide substrate 10 are fixedly connected with an adhesive or through fusion by electrical discharge. The multi-fiber SMF 52 corresponding to an output surface of the optical waveguide 15 is connected to the end surface on the second end 12 of the optical waveguide substrate 10 (step S06). Further, an optical component that is a PLC may be connected to the end surface on the second end 12 of the optical waveguide substrate 10 as an alternative to the SMF 52. In this case, the optical waveguide 15 is formed in the optical waveguide substrate 10 such that the optical waveguide 15 exposed on the end surface on the second end 12 of the optical waveguide substrate 10 is aligned with an optical port of the optical component.

The connection method according to the present embodiment eliminates the need for rotation alignment of the MCF 51 and enables the core arrangement of the MCF 51 exposed on the end surface of the fiber fixing part 21 to be made on the end surface on the first end 11 the optical waveguide substrate 10 with high accuracy, thereby making it possible to facilitate the connection work without loss caused by rotation alignment. Further, a connection to a multi-fiber MCF that is difficult for conventional connection techniques can be easily made. Further, since the connection method according to the present embodiment eliminates the need for rotation alignment of the MCF 51, the rotation angle of the MCF 51 may be larger than 1° on the connection surface of the fiber fixing part 21.

Note that the definition of "rotation angle" will be described with reference to FIG. 12. Focus will be given on a straight line 55 passing through the center of the MCF 51 and parallel to a bottom or top surface of the fiber fixing part 21 on the connection surface of the fiber fixing part 21. When the MCF 51 has two cores (FIG. 12(B)), an angle θ formed by a straight line 56 connecting the respective centers of the cores and the straight line 55 is defined as "rotation angle" (usually, rotation alignment is made to satisfy θ=0°). When the MCF 51 has four cores (FIG. 12(C)), the smallest angle θ among angles formed by each straight line 56 connecting the centers of cores opposite to each other and the straight line 55 is defined as "rotation angle" (usually, rotation alignment is made to satisfy θ=) 0°. When the MCF 51 has eight cores (FIG. 12(D)), the smallest angle θ among angles formed by each straight line 56 connecting the centers of cores opposite to each other and the straight line 55 is defined as "rotation angle" (usually, rotation alignment is made to satisfy θ=0°).

Figure 12:
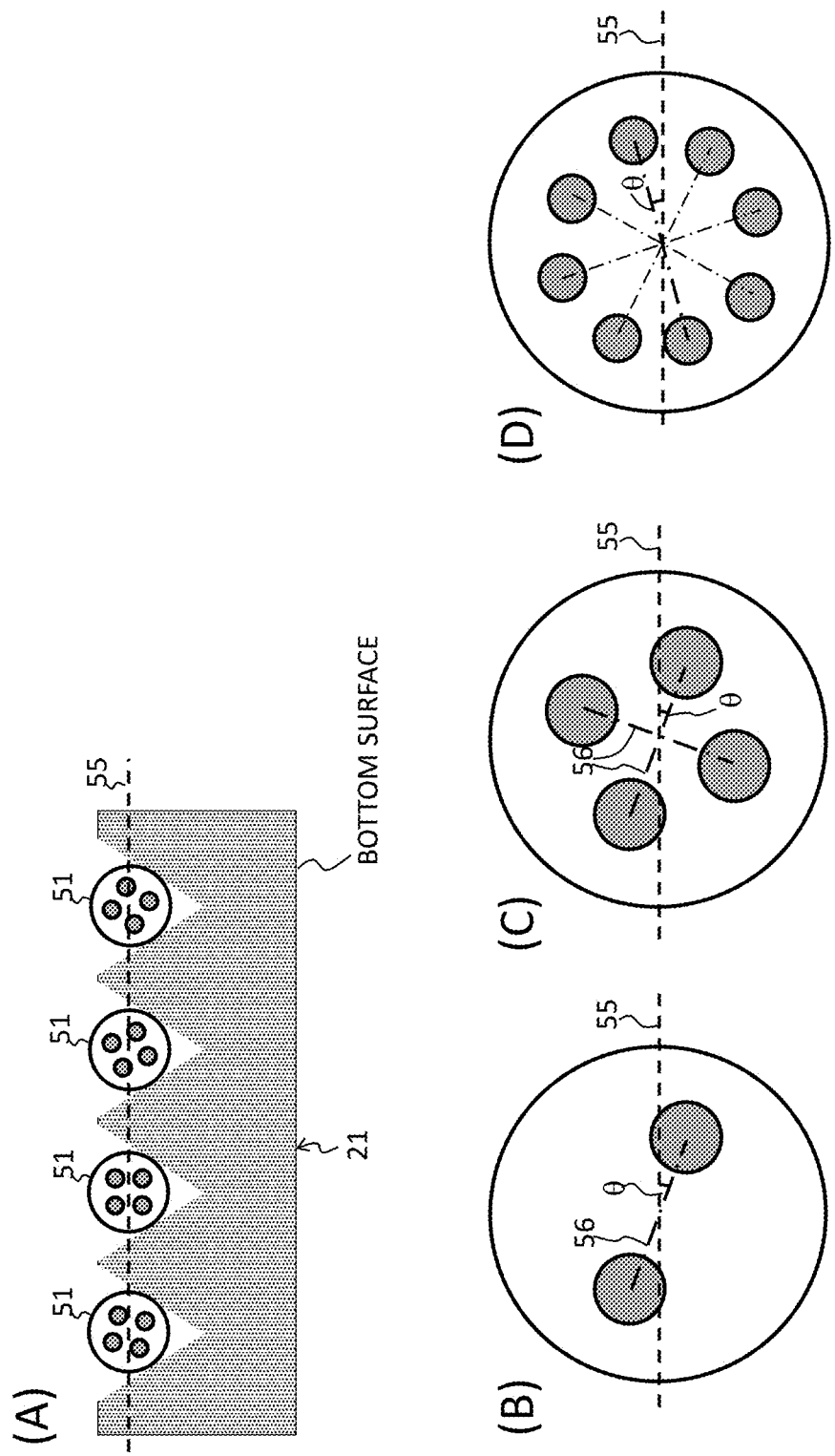
FIG. 12 is a diagram illustrating a definition of a rotation angle of a multi-core fiber.

Note that since the rotation angle only needs to be relatively the same among the MCFs, the definition of the rotation angle is not limited to the angle with respect to any reference line shown in FIG. 12 and may be a relative rotation angle (difference in rotation angle) between the rotation angle of any MCF and the rotation angle of a different MCF.

In FIG. 1, it is assumed that four fibers each having four cores used as the MCFs 51, and 16 fibers (two rows of eight fibers) used as the SMFs 51 are connected, and a structure is employed where the end surface of the first end 11 has a core arrangement corresponding to an end surface image representing the four-core fibers, and the end surface on the second end 12 has eight cores arranged, in the horizontal direction at intervals of 250 μm, in two rows. However, the connection method according to the present disclosure is also applicable to a structure where the MCF has any number and arrangement of cores and is further applicable to a structure where the MCF has a single or two or more fibers.

Figure 10:
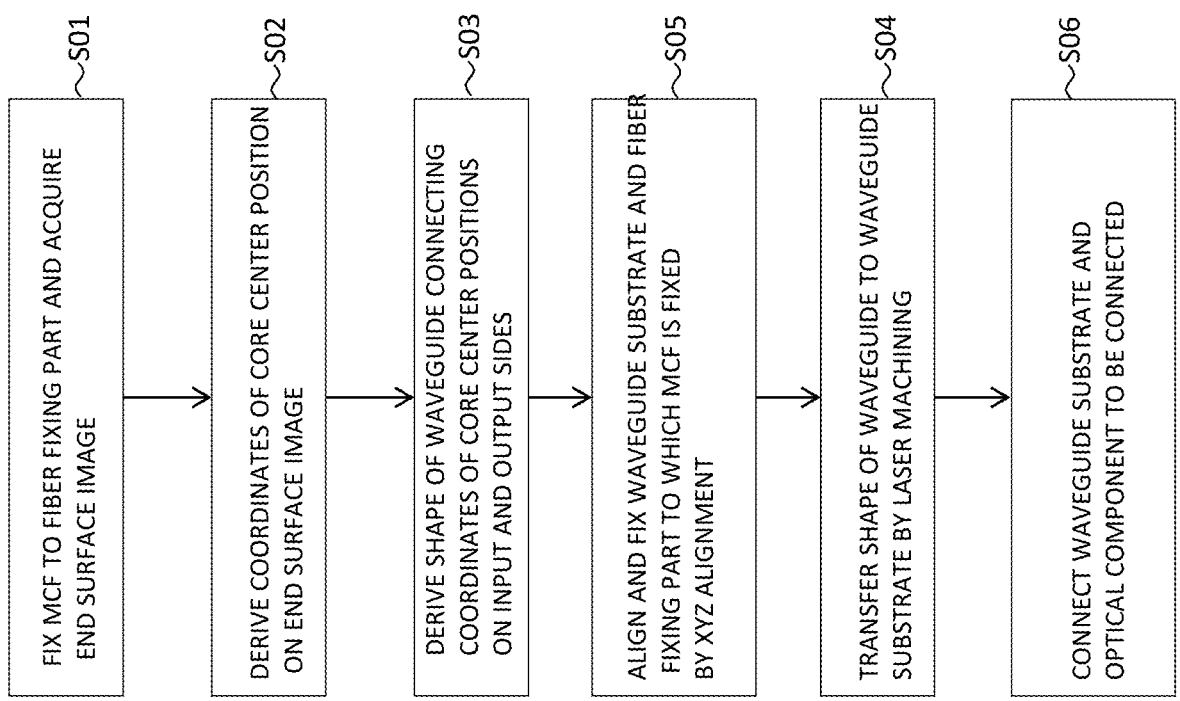
FIG. 10 is a flowchart illustrating the optical fiber connection method according to the present disclosure.
Figure 11:
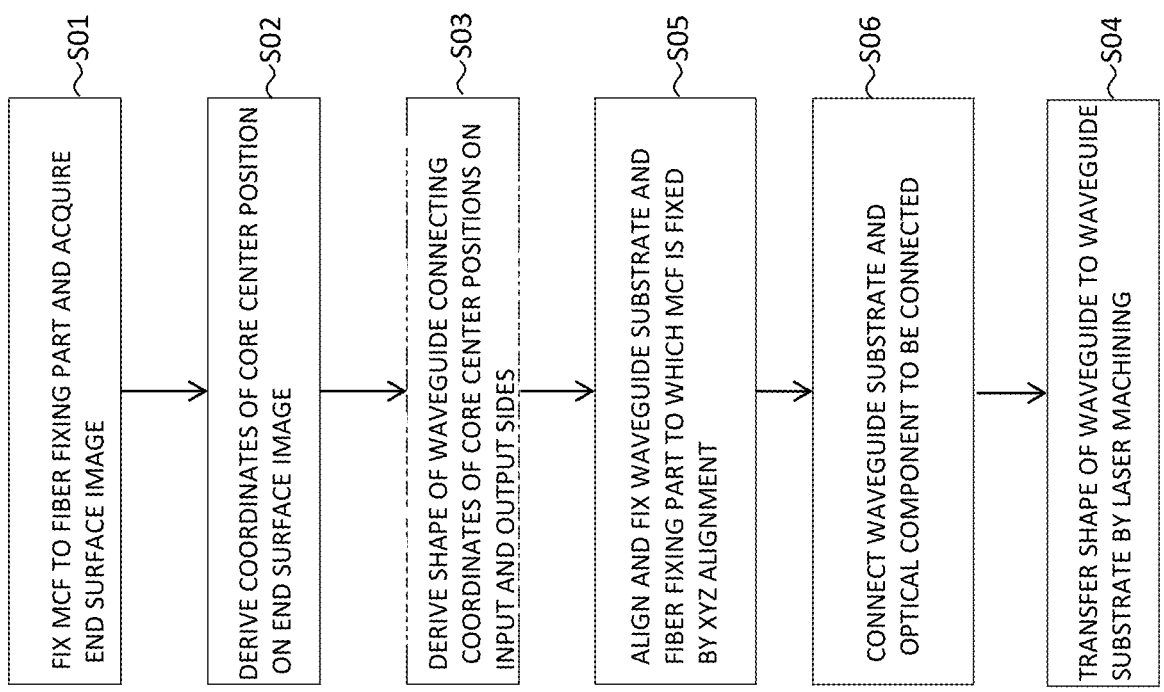
FIG. 11 is a flowchart illustrating the optical fiber connection method according to the present disclosure.

The connection method according to the present embodiment can also be executed in accordance with a procedure shown in FIG. 10 or 11. In the procedure shown in FIG. 10, the order of steps S04 and S05 is opposite to the order in the procedure shown in FIG. 3. The procedure shown in FIG. 11 is different from the procedure shown in FIG. 3 in that step S04 is executed last.

Second Embodiment

Figure 4:
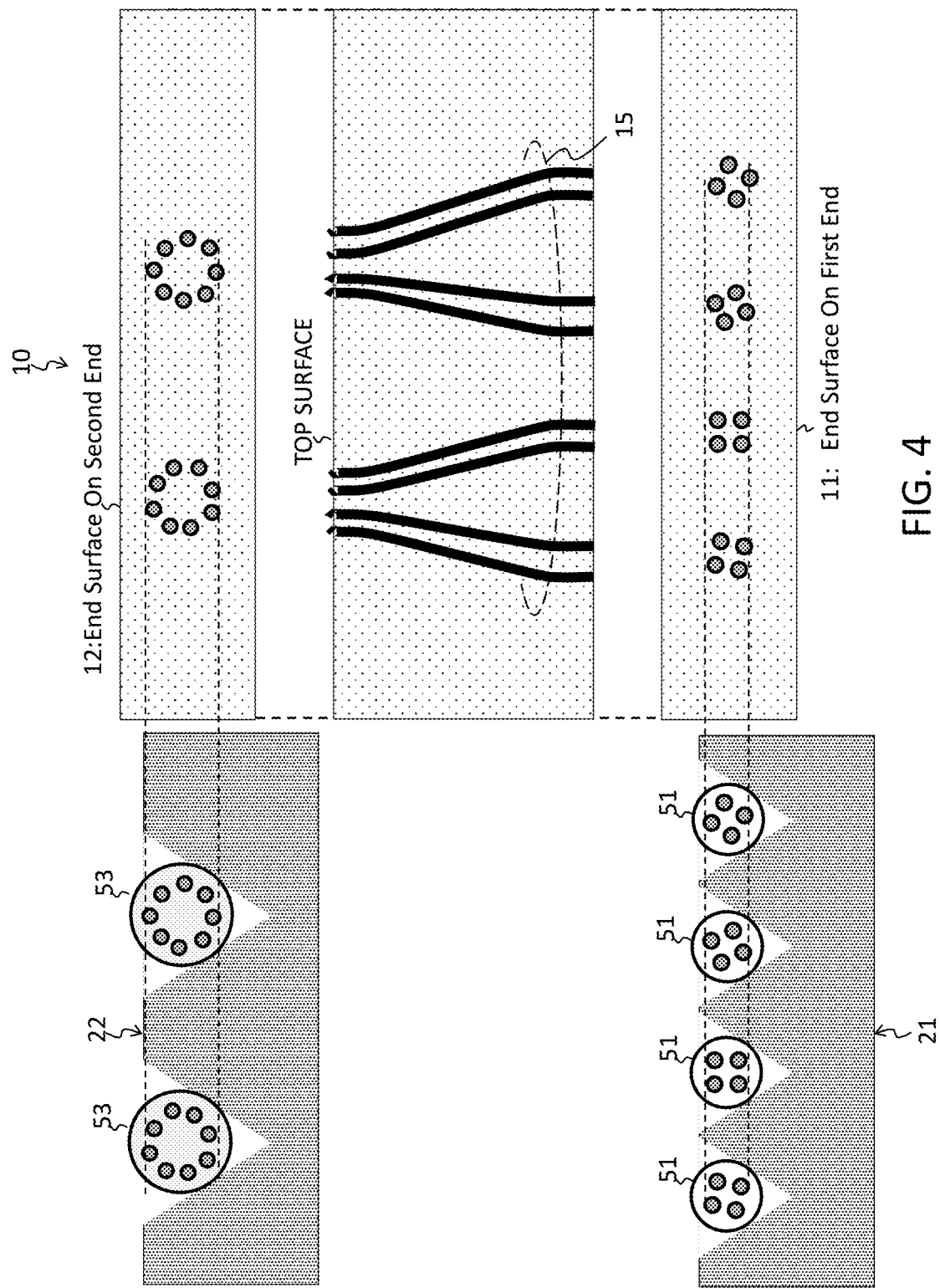
FIG. 4 is a diagram illustrating the optical fiber connection method according to the present disclosure.

FIG. 4 is a diagram illustrating an optical fiber connection method according to the present embodiment. According to the present embodiment, it is assumed that MCFs different in the number of cores and core arrangement from each other are connected. According to the present embodiment, in the connection method described in the first embodiment (see FIG. 3), in the end surface image acquisition procedure S01, an image of the connection surface of the second fiber fixing part 22 to which the optical fiber serving as a connection destination is fixed is further acquired, and in the coordinate derivation procedure S02, coordinates of a center position of a core of the optical fiber exposed on the connection surface of the second fiber fixing part 22 is further acquired. In a case shown in FIG. 4, four fibers each having four cores 51 as optical fibers serving as connection sources are fixed to the fiber fixing part 21, and two fibers each having eight cores 53 as optical fibers serving as connection destinations are fixed to the fiber fixing part 22.

According to the present embodiment, images of the end surfaces of both the fiber fixing parts (21, 22) to which the MCFs are fixed are acquired (step S01), and coordinates of a center position of each core on the fiber fixing parts (21, 22) are analyzed (step S02). Then, the core coordinates of the first fiber fixing part 21 are set as a starting point of the end surface on the first end 11 of the optical waveguide substrate 10, the core coordinates of the second fiber fixing part 22 are set as an endpoint of the end surface on the second end 12 of the optical waveguide substrate 10, and the optical waveguide 15 connecting the points is formed by laser inscription (steps S03, S04).

Subsequently, the first fiber fixing part 21 and the second fiber fixing part 22 are fixed by bonding or butting to the end surfaces on the first end 11 and the second end 12 of the optical waveguide substrate 10, respectively, thereby allowing MCFs different in core arrangement or the number of cores to be connected to each other (steps S05, S06). As described above, this connection method allows MCFs different in the number of cores or core arrangement to be connected to each other without rotation alignment.

Further, as described in the first embodiment, the connection method according to the present embodiment can also be executed in accordance with the procedure shown in FIG. 10 or 11.

Note that, with reference to FIG. 4, a description has been given of the case where four fibers each having four cores and two fibers each having eight cores are connected without rotation alignment, but this connection method does not depend on the number of fibers, the number of cores, and the core arrangement of MCFs and is applicable to a connection between MCFs having any number of fibers and structure. Further, this connection method can eliminate the need for rotation alignment of MCFs even when the MCFs identical in the number of cores and core arrangement are connected.

Third Embodiment

Figure 5:
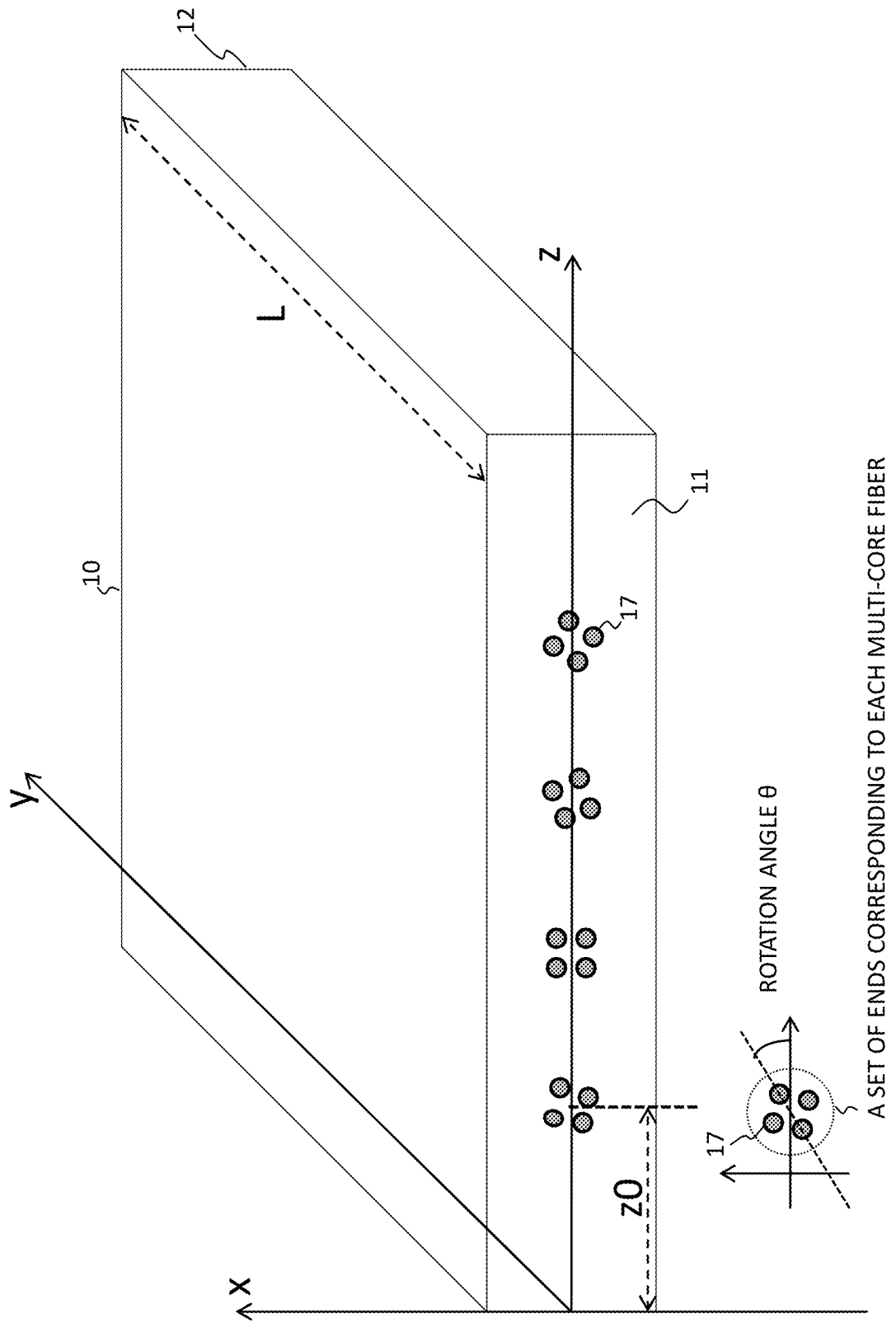
FIG. 5 is a diagram illustrating an optical waveguide substrate formed by the optical fiber connection method according to the present disclosure.

FIG. 5 is a diagram illustrating the coordinate derivation procedure S02 described in the first and second embodiments. The end surface on the first end 11 the optical waveguide substrate 10 is defined as an xz plane and is connected to the MCF 51 at y=0, and y=L corresponds to the end surface on the second end 12 of the optical waveguide substrate 10 and serves as an output end of the optical waveguide 15. In the end surface image acquisition procedure S01, the center position of each core can be obtained directly from the image of the first fiber fixing part 21 in the form of xz coordinates. For example, when N cores of the MCF 51 are arranged in an annular shape or regular polygonal shape, or when a fiber installation interval D is known in a case of a multi-fiber MCF, core coordinates at y=0 are represented as follows:

[Math. 1]

where, i represents the core number, and j represents the fiber number. $\Lambda$ represents a distance from a fiber center to each core, $\theta_j$ represents the amount of rotation (°) of a j-th MCF, $z_0$ represents a distance from the end of the optical waveguide substrate (x=0) to the center position of the first MCF.

According to the second embodiment, the core center coordinates are determined by the same method for the end surface on the second end 12 (y=L) of the optical waveguide substrate 10.

In the coordinate derivation procedure S02, the core position can be determined simply by analyzing the amount of rotation of the MCF from the end surface image, and thus the coordinates can be easily determined. As described above, the core center positions on the end surfaces on the first end 11 and second end 12 of the optical waveguide substrate 10 are determined, and an S-shaped path connecting the core center positions is derived (step S03), and a desired optical waveguide 15 is obtained by irradiating each path with a short-pulse laser by a width of ±a/2 μm centered on the path (step S04). Here, a represents a width of the optical waveguide.

The path derived in step S03 (a center position of the optical waveguide 15) can be represented as follows. According to the present embodiment, the path has a straight line parallel to a Y-axis direction in sections of y=0 to $y_1$ and $y=y_2$ to L, and a gentle curve connecting a position of the path at $y_1$ and a position of the path at $y_2$ in a section of $y_1$ to $y_2$ (a curve whose X coordinate and Y coordinate vary in the section of $y_1$ to $y_2$). This curve is referred to as "S-shape". Note that $0<y_1<y_2<L$ is satisfied. Specifically, the path can be represented as follows.

First, each variable is defined as follows:
[Math. 2].
Further, $y_m(=(y_1+y_2)/2)$.
When a relationship between a Z coordinate $z_{i,j}(0)$ of the core (i, j) at y=0 and a Z coordinate (L) of the core (i, j) at y=L is $z_{i,j}(0)>z_{i,j}(L)$,
[Math. 3].
When $z_{i,j}(0)<z_{i,j}(L)$ is satisfied,
[Math. 4].

These analysis procedures allow the coordinate acquisition of the core center, the determination of the waveguide shape, and the laser inscription on the optical waveguide substrate based on the waveguide shape to be automatically executed on software after acquiring the end surface image of the MCF, thereby making it possible to manufacture the optical waveguide substrate in accordance with an end surface state of the MCF with high accuracy and simplicity.

As described above, it is possible to manufacture the waveguide substrate 10 by inscribing a waveguide on a glass plate or a quartz plate by laser machining. That is, the waveguide substrate 10 includes:

a plurality of optical waveguides 15 (not shown in FIG. 5); and a connection surface 11 to which the multi-core fibers (not shown in FIG. 5) are connected, and an end 17 of each of the optical waveguides 15 to be connected to a corresponding one of cores of the multi-core fibers 51 is exposed on the connection surface 11, and a rotation angle θ of a set of the ends 17 for each multi-core fiber is larger than 1°.

Note that an arrangement of the ends 17 depends on the type of MCF to be connected, but the rotation angle θ is the same as the rotation angle of the MCF described with reference to FIG. 12.

Fourth Embodiment

Figure 6:
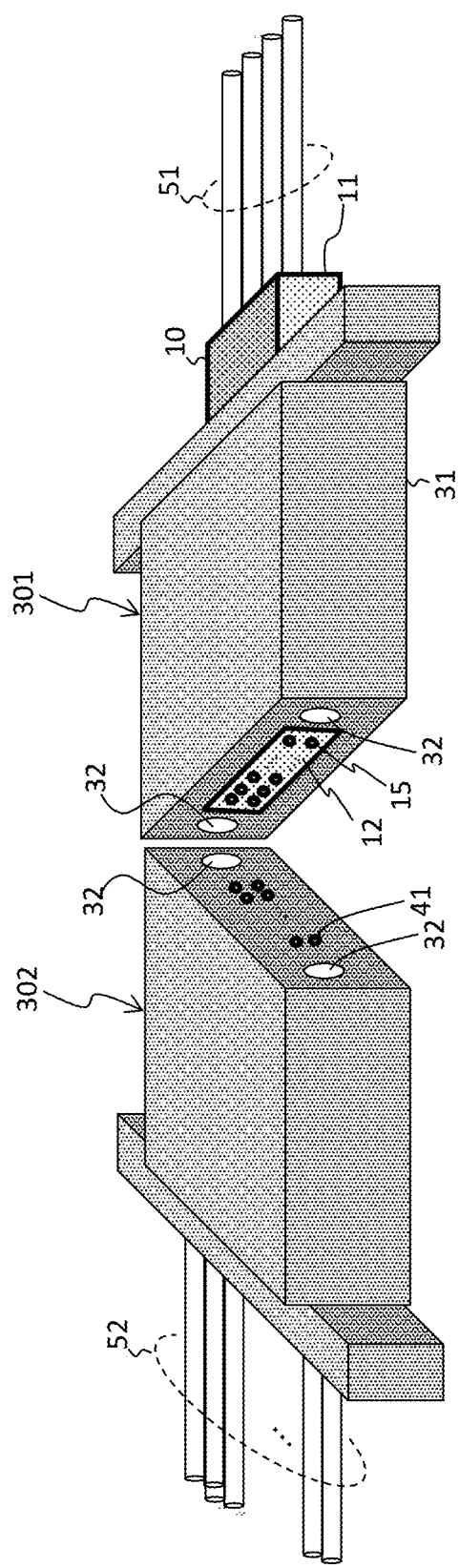
FIG. 6 is a diagram illustrating a method for manufacturing an optical connector according to the present disclosure.

FIG. 6 is a diagram illustrating an optical connector 301 according to the present embodiment. The optical connector 301 includes a multi-fiber connector ferrule 31 and the optical waveguide substrate 10. The optical connector 301 is manufactured as follows. A method for manufacturing an optical connector is a method for manufacturing the optical connector 301 structured to connect an optical fiber including a multi-core fiber to a different optical component, the method including:

an end surface image acquisition procedure of acquiring at least an image of the connection surface of the fiber fixing part 11 that is to be connected to the first end of the optical waveguide substrate 10 and to which the optical fiber is fixed;

a coordinate derivation procedure of acquiring, from the image of the connection surface acquired in the end surface image acquisition procedure, coordinates of a center position of a core of the optical fiber exposed on the connection surface of the fiber fixing part 11;

an optical waveguide formation procedure of inscribing, based on the coordinates acquired in the coordinate derivation procedure, an optical waveguide connecting the core of the optical fiber to an optical port 41 of the different optical component 302 on the optical waveguide substrate 10 along a desired path extending from the first end 11 to the second end 12 of the optical waveguide substrate 10;

a substrate preparation process of preparing the optical waveguide substrate 10; and a substrate fixing process of causing the optical waveguide substrate 10 prepared in the substrate preparation process to be inserted into and fixed to the multi-fiber connector ferrule 31.

The end surface image acquisition procedure, the coordinate derivation procedure, and the optical waveguide formation procedure are the same as described in the first embodiment. That is, in the substrate preparation process, the optical waveguide 15 is formed in the optical waveguide substrate 10, and the MCF 51 is connected as illustrated in steps S01 to S05 of the flowchart shown in FIG. 3, and, in the substrate fixing process, the optical waveguide substrate 10 is inserted into and fixed to a multi-fiber connector ferrule such as an MT connector or an MPO connector.

The multi-fiber connector ferrule 31 shown in FIG. 6 has the same interface as an interface of an existing MT connector, and has a hole 32 into which a fixing guide pin is inserted and has a space at the center into which the optical waveguide substrate 10 is inserted. Accurately positioning the center position of the optical waveguide 15 exposed on the end surface on the second end 12 of the optical waveguide substrate 10 with respect to the guide pin hole 32 and the optical port 41 serving as a connection destination eliminates the need for of alignment work between the SNF 52 or an optical component to be connected, and the optical waveguide substrate 10. That is, it is possible to provide an optical connector that can be easily attached to and detached from a single-fiber or multi-fiber MCF 51, an existing multi-fiber SMF connector 302, or other optical components.

Further, making the optical waveguide substrate 10 flush with the end surface of the ferrule 31 on the connection surface of the optical connector 301 or making the optical waveguide substrate 10 protrude about several μm from the connection surface makes it possible to suppress reflection between the optical waveguide substrate 10 and the multi-fiber SMF 52 and allows a PC connection.

Fifth Embodiment

Figure 7:
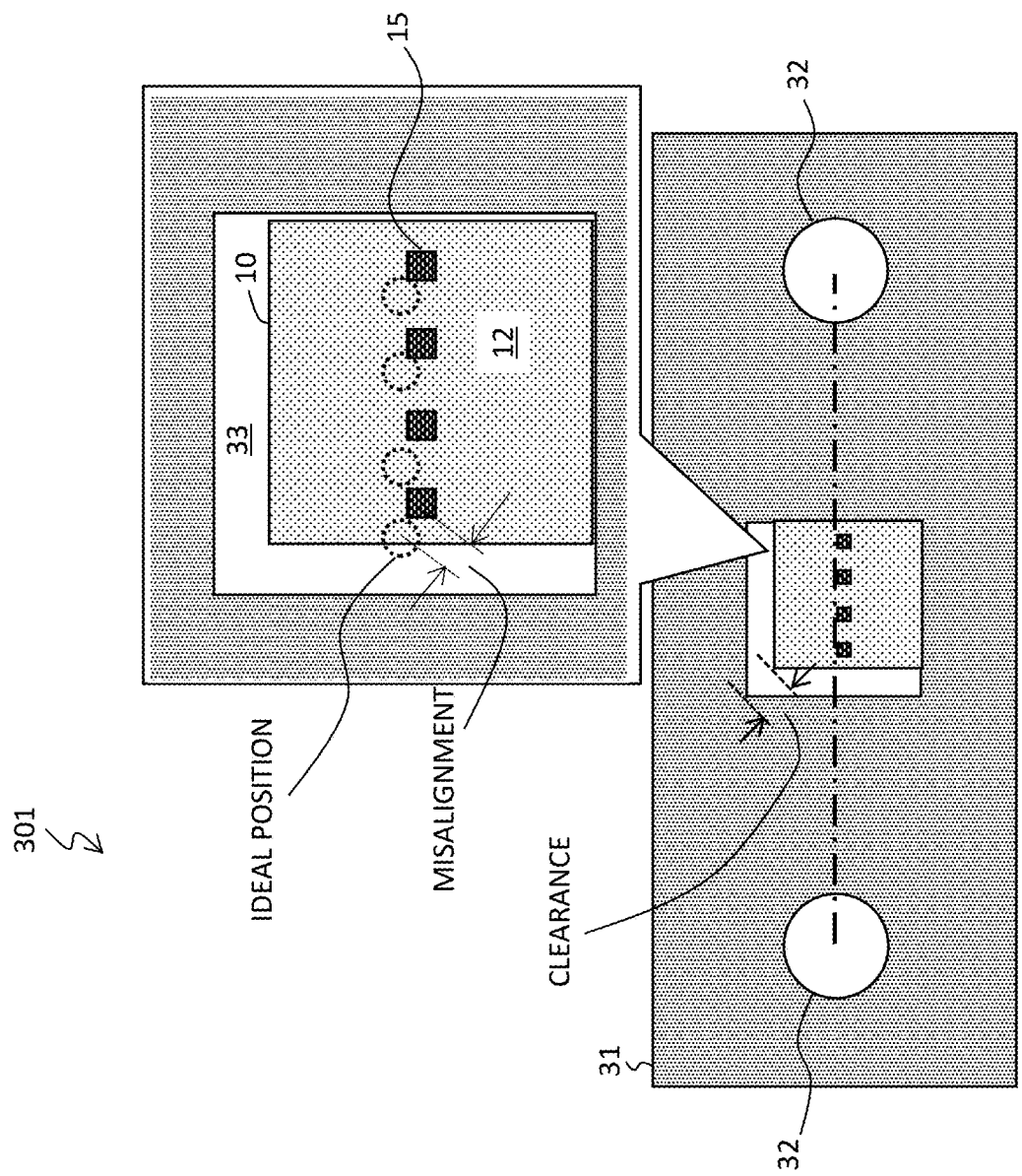
FIG. 7 is a diagram illustrating the method for manufacturing an optical connector according to the present disclosure.

In the present embodiment, a description will be given of details of the substrate fixing process. FIG. 7 is a diagram showing accuracy of a space 33 and the optical waveguide substrate 10 in the multi-fiber connector ferrule 31. As shown in FIG. 7, the multi-fiber connector ferrule 31 has the space 33 into which an optical fiber or the optical waveguide substrate 10 is inserted, and the space 33 has a certain clearance relative to the optical waveguide substrate 10. It is conceivable that the clearance causes the optical waveguide 15 to be misaligned from the position (ideal position) of the optical port 41 of the optical connector 302 facing the optical waveguide 15.

Figure 8:
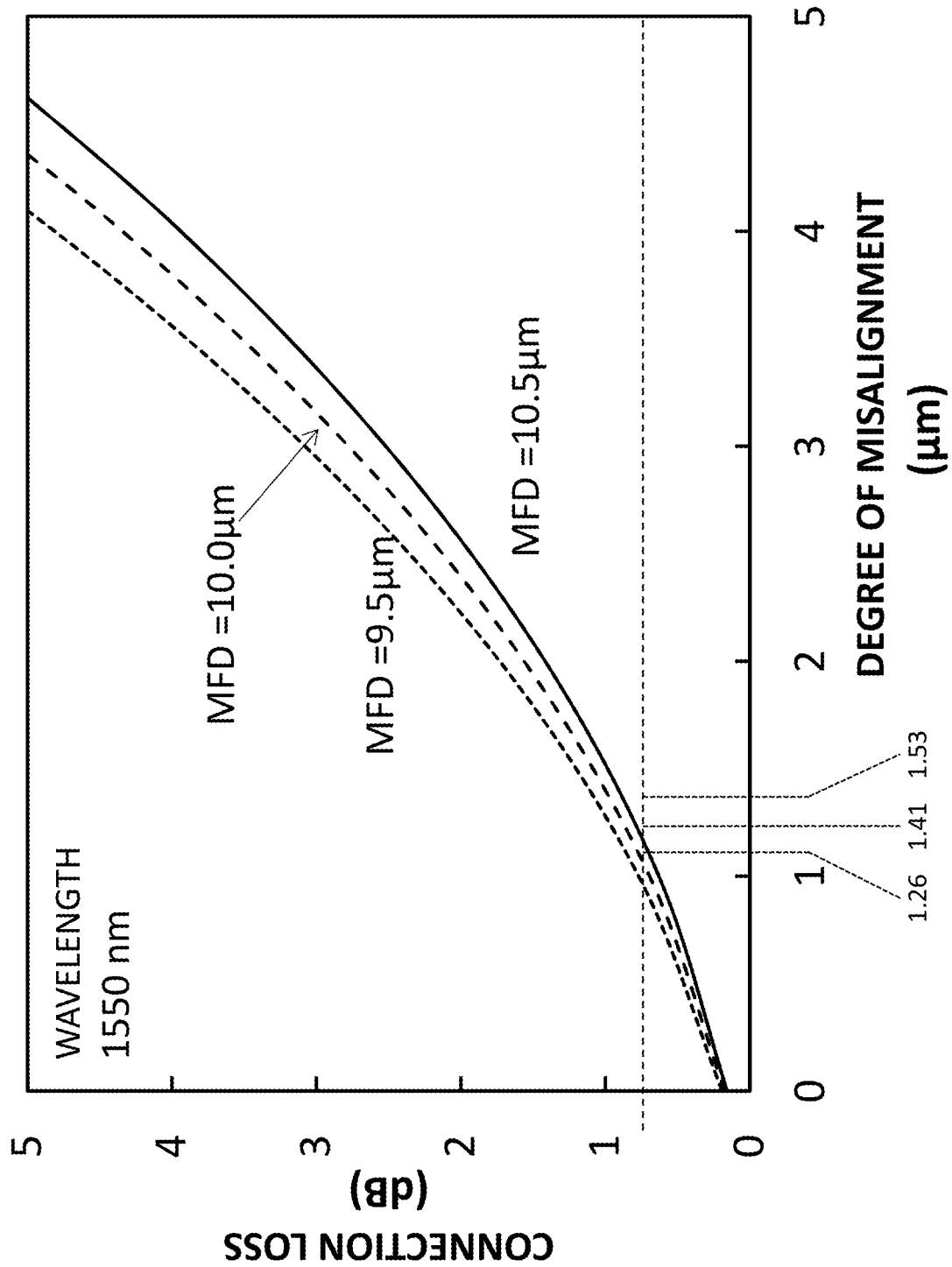
FIG. 8 is a graph illustrating a connection loss due to optical waveguide misalignment in the method for manufacturing an optical connector according to the present disclosure.

FIG. 8 is a graph illustrating connection loss relative to a degree of misalignment between the optical waveguide 15 and the optical port 41 on the end surface on the second end 12 of the optical waveguide substrate 10. FIG. 8 is a graph showing connection loss for each mode field diameter (MFD) at a wavelength of 1550 nm, relative to the degree of misalignment when single-mode fibers are connected. Here, when the guide pin hole 32 is too large relative to the guide pin, the loss increases, but taking into consideration that the clearance relative to the guide pin hole in the existing MT connector is equal to or less than 1 μm, it is assumed that misalignment of 1 μm is present at an initial position (the degree of misalignment is 0 μm) in FIG. 8.

Figure 9:
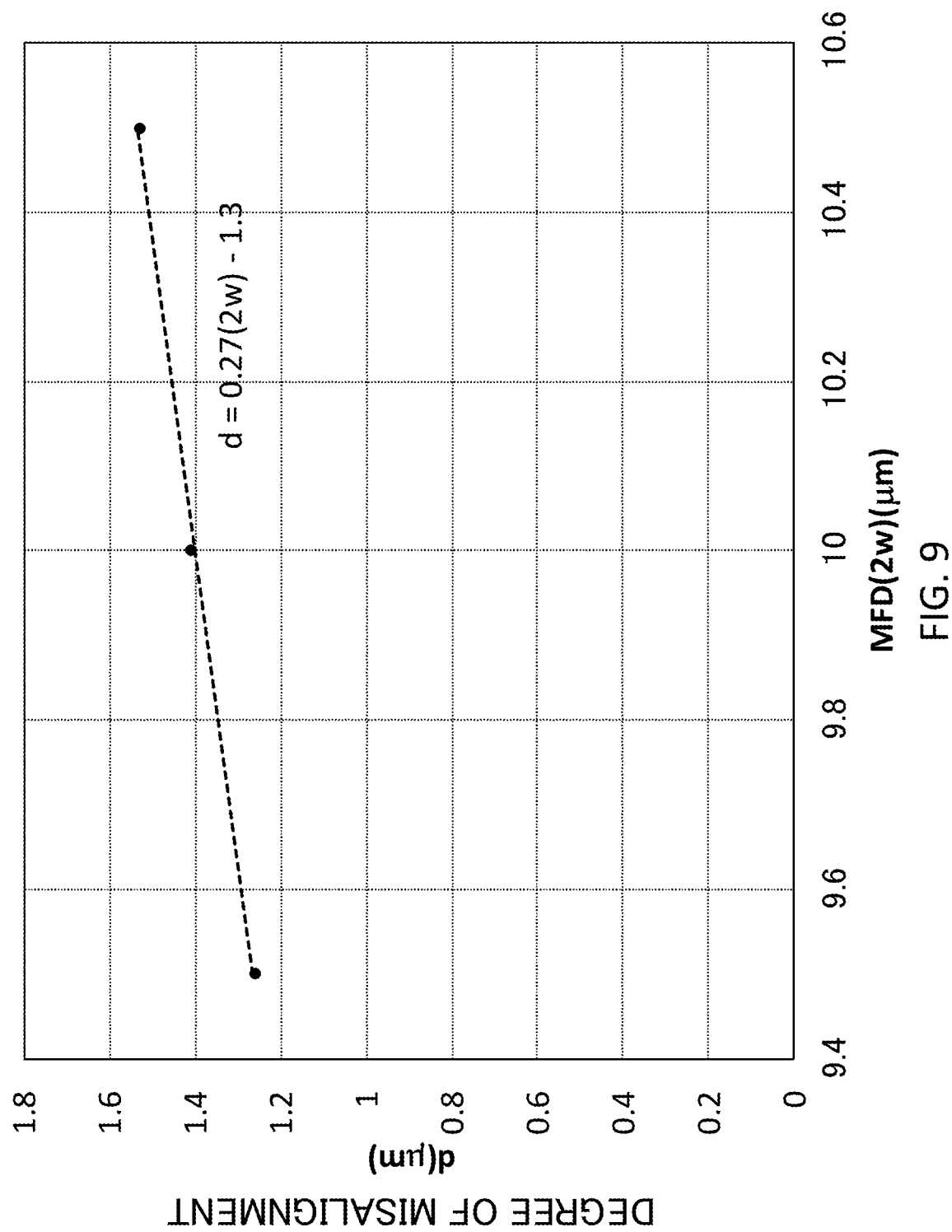
FIG. 9 is a graph illustrating a relationship between a degree of misalignment between a ferrule space and the optical waveguide substrate and a mode field diameter in the method for manufacturing an optical connector according to the present disclosure.

It can be confirmed that the connection loss increases exponentially as the degree of misalignment increases with any MFD. Here, when the degree of misalignment at which the connection loss is equal to or less than 1 dB is obtained from FIG. 8, the degree of misalignment is equal to or less than 1.26 μm with the MFD of 9.5 μm, equal to or less than 1.41 μm with the MFD of 10.0 μm, and equal to or less than 1.52 μm with the MFD of 10.5 μm. FIG. 9 is a graph summarizing degrees of misalignment d at which the connection loss is equal to 1 dB relative to MFD (2w). FIG. 9 also shows an approximate expression.

Approximate expression: $d=0.27(2w)-1.3(\mu m)$

From FIG. 9, it can be confirmed that the connection loss can be equal to or less than 1 dB in a region below a straight line corresponding to the approximate expression. Therefore, in the optical connector 301, when the clearance of the multi-fiber connector ferrule 31 relative to the optical waveguide substrate 10 is equal to or less than d (μm), the connection loss can be equal to or less than 1 dB at maximum.

In other words, in the optical connector 301, the space 33 of the multi-fiber connector ferrule 31 in which the optical waveguide substrate 10 is held and the optical waveguide substrate 10 form a rectangular shape on a plane orthogonal to a longitudinal direction of the optical fiber, and when the optical waveguide substrate 10 is misaligned to a maximum degree in the space 33, a maximum distance between an apex of the space 33 and an apex of the optical waveguide substrate 10 on the orthogonal plane is equal to or less than the above-described approximate expression.

Other Embodiments

Note that the descriptions have been given of FIGS. 4 and 5 using the MT connector ferrule, but the same applies to an MPO connector ferrule in that alignment is made using the guide pin, and the optical connector 301 may be an MPO connector.

Effect of the Present Disclosure

The optical fiber connection method and connection component according to the present disclosure have an effect of eliminating the need for rotation control of the MCF, suppressing an increase in loss due to the rotation control, making the work simple, and allowing the connection between different optical fiber structures such as the connection between the MCF and the SMF or the connection between the MCFs different in core arrangement to be made in an easy and direct-detachable manner.

INDUSTRIAL APPLICABILITY

The present disclosure is applicable to a connection between an optical fiber and an optical component in an optical communication system.

REFERENCE SIGNS LIST

10 Optical waveguide substrate
11 (end surface on) First end
12 (end surface on) Second end
15 Optical waveguide
17 End
21 Fiber fixing part
22 Fiber fixing part
31 Multi-fiber connector ferrule
32 Guide pin hole
33 Space
41 Optical port
51 Multi-core fiber (MCF)
52 Single-mode fiber (SMF)
53 Multi-core fiber (MCF)
301 Optical connector
302 Optical connector

What is claimed is:

1. A connection device that connects an optical fiber serving as a connection destination and an optical fiber that is a multi-core fiber serving as a connection source using an optical waveguide substrate, the connection device comprising:
    an end surface image acquisition part structured to acquire at least an image of a connection surface of a first fiber fixing part that is to be connected to a first end of the optical waveguide substrate and to which the optical fiber serving as a connection source is fixed;
    a coordinate derivation part structured to acquire, from the image of the connection surface acquired by the end surface image acquisition part, coordinates of a center position of a core of the optical fiber exposed on the connection surface of the first fiber fixing part;
    an optical waveguide formation part structured to inscribe, based on the coordinates acquired by the coordinate derivation part, an optical waveguide connecting the core of the optical fiber serving as a connection source to a core of the optical fiber serving as a connection destination in the optical waveguide substrate along a desired path extending from the first end to a second end of the optical waveguide substrate; and
    a connection part structured to connect the connection surface of the first fiber fixing part to the first end of the optical waveguide substrate and to connect a connection surface of a second fiber fixing part to which the optical fiber serving as a connection destination is fixed to the second end.

2. The connection device according to claim 1, wherein a rotation angle of the multi-core fiber on the connection surface of the first fiber fixing part is larger than 1°.

3. The connection device according to claim 1, wherein
    the end surface image acquisition part further acquires an image of the connection surface of the second fiber fixing part to which the optical fiber serving as a connection destination is fixed, and
    the coordinate derivation part further acquires coordinates of a center position of the core of the optical fiber exposed on the connection surface of the second fiber fixing part.

4. The connection device according to claim 3, wherein the optical fiber serving as a connection destination is also a multi-core fiber.

5. The connection device according to claim 4, wherein a rotation angle of the multi-core fiber on the connection surface of the second fiber fixing part is larger than 1°.

6. An optical connector manufacturing device that manufactures an optical connector structured to connect an optical fiber including a multi-core fiber to a different optical component, the optical connector manufacturing device comprising:
    an end surface image acquisition part structured to acquire at least an image of a connection surface of a fiber fixing part that is to be connected to a first end of an optical waveguide substrate and to which the optical fiber is fixed;
    a coordinate derivation part structured to acquire, from the image of the connection surface acquired by the end surface image acquisition part, coordinates of a center position of a core of the optical fiber exposed on the connection surface of the fiber fixing part;
    an optical waveguide formation part structured to inscribe, based on the coordinates acquired by the coordinate derivation part, an optical waveguide connecting the core of the optical fiber to an optical port of the different optical component in the optical waveguide substrate along a desired path extending from the first end to a second end of the optical waveguide substrate;
    a substrate preparation jig structured to prepare the optical waveguide substrate; and
    a substrate fixing jig structured to cause the optical waveguide substrate prepared by the substrate preparation jig to be inserted into and fixed to a multi-fiber connector ferrule.

7. The optical connector manufacturing device according to claim 6, wherein
    a space of the multi-fiber connector ferrule in which the optical waveguide substrate is held and the optical waveguide substrate form a rectangular shape on a plane orthogonal to a longitudinal direction of the optical fiber, and when the optical waveguide substrate is misaligned to a maximum degree in the space, a maximum distance between an apex of the space and an apex of the optical waveguide substrate on the orthogonal plane is equal to or less than d (μm) represented by an equation C1:

$$d = 0.27(2w) - 1.3 \quad \text{(Equation C1)}$$

where 2w represents a mode field diameter (μm) of the optical fiber at a wavelength of 1550 nm.

8. The optical connector manufacturing device according to claim 6, wherein
    a rotation angle of the multi-core fiber on the connection surface of the fiber fixing part is larger than 1°.

9. A connection method for connecting an optical fiber serving as a connection destination and an optical fiber that is a multi-core fiber serving as a connection source using an optical waveguide substrate, the connection method comprising:

an end surface image acquisition procedure of acquiring at least an image of a connection surface of a first fiber fixing part that is to be connected to a first end of the optical waveguide substrate and to which the optical fiber serving as a connection source is fixed;

a coordinate derivation procedure of acquiring, from the image of the connection surface acquired in the end surface image acquisition procedure, coordinates of a center position of a core of the optical fiber exposed on the connection surface of the first fiber fixing part;

an optical waveguide formation procedure of inscribing, based on the coordinates acquired in the coordinate derivation procedure, an optical waveguide connecting the core of the optical fiber serving as a connection source to a core of the optical fiber serving as a connection destination in the optical waveguide substrate along a desired path extending from the first end to a second end of the optical waveguide substrate; and a connection procedure of connecting the connection surface of the first fiber fixing part to the first end of the optical waveguide substrate having the optical waveguide inscribed in the optical waveguide formation procedure and connecting a connection surface of a second fiber fixing part to which the optical fiber serving as a connection destination is fixed to the second end.

10. A connection method for connecting an optical fiber serving as a connection destination and an optical fiber that is a multi-core fiber serving as a connection source using an optical waveguide substrate, the connection method comprising:

an end surface image acquisition procedure of acquiring at least an image of a connection surface of a first fiber fixing part that is to be connected to a first end of the optical waveguide substrate and to which the optical fiber serving as a connection source is fixed;

a coordinate derivation procedure of acquiring, from the image of the connection surface acquired in the end surface image acquisition procedure, coordinates of a center position of a core of the optical fiber exposed on the connection surface of the first fiber fixing part;

a connection procedure of connecting the connection surface of the first fiber fixing part to the first end of the optical waveguide substrate; and an optical waveguide formation procedure of inscribing, based on the coordinates acquired in the coordinate derivation procedure, an optical waveguide connecting the core of the optical fiber serving as a connection source to a core of the optical fiber serving as a connection destination in the optical waveguide substrate along a desired path extending from the first end to a second end of the optical waveguide substrate.

11. The connection method according to claim 10, wherein in the connection procedure, a connection surface of a second fiber fixing part to which the optical fiber serving as a connection destination is fixed is connected to the second end of the optical waveguide substrate.

12. The connection method according to claim 10, wherein after the optical waveguide formation procedure, a connection surface of a second fiber fixing part to which the optical fiber serving as a connection destination is fixed is further connected to the second end of the optical waveguide substrate.

13. The connection method according to claim 11, wherein a rotation angle of the multi-core fiber on the connection surface of the first fiber fixing part is larger than 1°.

14. The connection method according to claim 10, wherein in the end surface image acquisition procedure, an image of the connection surface of the second fiber fixing part to which the optical fiber serving as a connection destination is fixed is further acquired, and in the coordinate derivation procedure, coordinates of a center position of the core of the optical fiber exposed on the connection surface of the second fiber fixing part is further acquired.

15. The connection method according to claim 14, wherein the optical fiber serving as a connection destination is also a multi-core fiber.

16. The connection method according to claim 15, wherein a rotation angle of the multi-core fiber on the connection surface of the second fiber fixing part is larger than 1°.

17. A method for manufacturing an optical connector structured to connect an optical fiber including a multi-core fiber to a different optical component, the method comprising:

an end surface image acquisition procedure of acquiring at least an image of a connection surface of a fiber fixing part that is to be connected to a first end of an optical waveguide substrate and to which the optical fiber is fixed;

a coordinate derivation procedure of acquiring, from the image of the connection surface acquired in the end surface image acquisition procedure, coordinates of a center position of a core of the optical fiber exposed on the connection surface of the fiber fixing part;

an optical waveguide formation procedure of inscribing, based on the coordinates acquired in the coordinate derivation procedure, an optical waveguide connecting the core of the optical fiber to an optical port of the different optical component on the optical waveguide substrate along a desired path extending from the first end to a second end of the optical waveguide substrate;

a substrate preparation process of preparing the optical waveguide substrate; and a substrate fixing process of causing the optical waveguide substrate prepared in the substrate preparation process to be inserted into and fixed to a multi-fiber connector ferrule.

18. The method for manufacturing an optical connector according to claim 17, wherein a space of the multi-fiber connector ferrule in which the optical waveguide substrate is held and the optical waveguide substrate form a rectangular shape on a plane orthogonal to a longitudinal direction of the optical fiber, and when the optical waveguide substrate is misaligned to a maximum degree in the space, a maximum distance between an apex of the space and an apex of the optical waveguide substrate on the orthogonal plane is equal to or less than d (μm) represented by an equation C1:

$$d=0.27(2w)-1.3 \tag{Equation C1}$$

where 2w represents a mode field diameter (μm) of the optical fiber at a wavelength of 1550 nm.

19. The method for manufacturing an optical connector according to claim 17, wherein
a rotation angle of the multi-core fiber on the connection surface of the fiber fixing part is larger than 1°.

20. The connection method according to claim 13, wherein
a rotation angle of the multi-core fiber on the connection surface of the first fiber fixing part is larger than 1°.

21. The connection method according to claim 9, wherein
in the end surface image acquisition procedure, an image of the connection surface of the second fiber fixing part to which the optical fiber serving as a connection destination is fixed is further acquired, and
in the coordinate derivation procedure, coordinates of a center position of the core of the optical fiber exposed on the connection surface of the second fiber fixing part is further acquired.

22. The connection method according to claim 21, wherein
the optical fiber serving as a connection destination is also a multi-core fiber.

23. The connection method according to claim 22, wherein
a rotation angle of the multi-core fiber on the connection surface of the second fiber fixing part is larger than 1°.

24. The connection method according to claim 12, wherein
a rotation angle of the multi-core fiber on the connection surface of the first fiber fixing part is larger than 1°.

25. The connection method according to claim 10, wherein
in the end surface image acquisition procedure, an image of the connection surface of the second fiber fixing part to which the optical fiber serving as a connection destination is fixed is further acquired, and
in the coordinate derivation procedure, coordinates of a center position of the core of the optical fiber exposed on the connection surface of the second fiber fixing part is further acquired.

26. The connection method according to claim 25, wherein
the optical fiber serving as a connection destination is also a multi-core fiber.

27. The connection method according to claim 26, wherein
a rotation angle of the multi-core fiber on the connection surface of the second fiber fixing part is larger than 1°.

* * * * *